United States Patent
Sidhu et al.

(10) Patent No.: US 7,238,307 B2
(45) Date of Patent: Jul. 3, 2007

(54) METHOD FOR PRE-CONDITIONING INSERTS FOR INJECTION MOLDING

(75) Inventors: Jotinderpal S. Sidhu, Irvne, CA (US); Andrew J. McKenzie, Long Beach, CA (US); Ahmad A. Barzak, Paramount, CA (US); Nancy L. S. Yamasaki, Long Beach, CA (US)

(73) Assignee: Younger Mfg. Co., Torrance, CA (US)

( * ) Notice: Subject to any disclaimer, the term of this patent is extended or adjusted under 35 U.S.C. 154(b) by 425 days.

(21) Appl. No.: 10/601,087

(22) Filed: Jun. 20, 2003

(65) Prior Publication Data

US 2004/0262791 A1    Dec. 30, 2004

(51) Int. Cl.
*B29D 11/00*    (2006.01)

(52) U.S. Cl. .................. 264/2.6; 264/1.7; 264/489; 264/491; 264/492

(58) Field of Classification Search ................ 264/1.1, 264/1.31, 1.32, 2.7, 1.7, 2.6, 489, 491, 492; 425/808

See application file for complete search history.

(56) References Cited

U.S. PATENT DOCUMENTS

| | | | | |
|---|---|---|---|---|
| 4,751,029 A | * | 6/1988 | Swanson | 264/40.4 |
| 4,923,758 A | | 5/1990 | Marks et al. | 428/437 |
| 5,051,309 A | | 9/1991 | Kawaki et al. | 428/332 |
| 5,084,226 A | | 1/1992 | Tarlton et al. | 264/316 |
| 5,096,652 A | * | 3/1992 | Uchiyama et al. | 264/511 |
| 5,259,999 A | | 11/1993 | Iwakiri et al. | 264/1.4 |
| 5,434,707 A | | 7/1995 | Dalzell et al. | 359/485 |
| 5,599,608 A | | 2/1997 | Yamamoto et al. | 428/192 |
| 5,641,372 A | | 6/1997 | Okuno | 156/230 |
| 5,827,614 A | | 10/1998 | Bhalakia et al. | 428/411.1 |
| 5,853,510 A | | 12/1998 | Lawson | 156/64 |
| 5,968,444 A | | 10/1999 | Yamamoto | 264/519 |
| 6,090,336 A | * | 7/2000 | Hirmer et al. | 264/511 |
| 6,117,384 A | | 9/2000 | Laurin et al. | 264/297.2 |
| 6,177,032 B1 | | 1/2001 | Smith et al. | 264/1.34 |
| 6,256,152 B1 | | 7/2001 | Coldrey et al. | 359/642 |
| 6,432,327 B2 | | 8/2002 | Beeloo et al. | 264/1.34 |
| 6,440,524 B2 | | 8/2002 | Valyi et al. | 428/99 |
| 6,554,421 B1 | | 4/2003 | Billard et al. | 351/41 |
| 2002/0080488 A1 | | 6/2002 | Nakagoshi | 359/488 |

FOREIGN PATENT DOCUMENTS

| | | |
|---|---|---|
| EP | 0 299 509 | 1/1989 |
| JP | 56013139 | 2/1981 |

* cited by examiner

*Primary Examiner*—Mathieu D. Vargot
(74) *Attorney, Agent, or Firm*—Sheppard, Mullin, Richter & Hampton LLP

(57) ABSTRACT

A method is disclosed for pre-conditioning inserts for improved replication during injection molding. The pre-conditioned inserts provide improved bonding with the injection-material and improved replication of complex molding surfaces. The pre-conditioning of the inserts comprises placing the insert in position against the molding surface, followed by heat-soaking the insert. Heat-soaking can be accomplished using infrared energy, preferably broadband infrared energy or energy that is preferentially absorbed by the insert.

14 Claims, 2 Drawing Sheets

METHOD FOR PRE-CONDITIONING INSERTS FOR INJECTION MOLDING

BACKGROUND OF THE INVENTION

This invention relates generally to injection-molded parts incorporating inserts and, more particularly, to methods for pre-conditioning such inserts for improved bonding to the injection-molded material and for improved replication of complex shapes.

It is often desirable to enhance or alter the properties of an injection-molded plastic part. One method to accomplish this is to include in the mold an insert having an additional desired feature. For instance, an insert having exceptional abrasion resistance can be placed in a mold, and softer plastic injected behind it, to create a composite part having a scratch-resistant outer surface. Similarly, an insert having specific optical properties or decorations can be used, to impart a specific optical performance or stylized appearance to the subsequently molded part.

However, challenges can arise when the insert and the molding plastic are formed of dissimilar materials, or when the resultant composite part must very accurately replicate the molding shape. These challenges generally increase with the complexity of the molding shape.

For example, in the case of an optical part, such as a lens, the part must exhibit excellent replication of the molding surface to perform its function. However, if this molding surface has a significantly different curvature from that of the insert placed against it, the insert might not fit or replicate this surface properly, resulting in optical distortion or incorrect optical power. In addition, the mismatch in shapes might irreparably damage the insert, e.g., by wrinkling, buckling, or burning from inconsistent thermal contact, causing optical and cosmetic defects in the molded part.

Various methods to join single sheets of one material to a molten plastic of a second material during injection molding have been described, for example, in U.S. Pat. Nos. 5,084,226, 6,432,327, and 6,554,421. However, with thicker, multi-layer, or more resilient inserts, the insert might not conform to the mold without further steps to encourage replication. One common approach is to pre-shape the multi-layer insert into contours similar to that of the final part, using heat and pressure or vacuum force, as described, for example, in U.S. Pat. Nos. 5,599,608 and 6,177,032, and in published U.S. Patent Application No. 2002/0080488 and in European Patent No. EP 0299 509 B1, all of which are incorporated herein by reference. This approach is sufficient in many instances to allow the shape of the composite part to replicate that of the mold. However, for more complex shapes, it is more difficult to pre-form the wafers with sufficient accuracy that they do not deform in use and thus add to cosmetic or optical distortions and aberrations. This is especially difficult when attempting to replicate highly asymmetrical or structured shapes. The problem is further compounded for optical parts, which must accurately control light paths to focus, magnify, or spectrally alter the light.

In addition to shape mismatches leading to poor replication, insert molding also can be complicated by poor bonding between the insert and the injected plastic. Again, this can burn or wrinkle the insert, and it can cause spot delaminations that can degrade the part's optical, cosmetic and structural integrity. A general weakness of the bond also can bring about unacceptable failures during normal use of the part. Improved bonding between discrete parts can be provided by appropriate surface treatments, by the use of adhesives, or by the use of local heating, as described in U.S. Pat. No. 5,853,510. However, these approaches might not be suitable or effective for injection molding, because the insert will be subjected to much more extreme conditions of heat and pressure during the molding process, which can mitigate any pretreatment. Consequently, alternative methods to strengthen this bond are indicated.

It should, therefore, be appreciated that there remains a need for an improved method for bonding an insert to a substrate during an injection molding process, which is not unduly time-consuming, and which is more adaptable to a broad range of molded parts. The present invention satisfies this need.

SUMMARY OF THE INVENTION

The present invention resides in a method of pre-conditioning an insert for improved bonding and replication of a molding surface during subsequent injection molding. The method includes steps of (1) providing an insert having a curvature measurably different from the average curvature of the molding surface, (2) placing the insert in position against the molding surface, and (3) heat-soaking the insert.

In optional, more detailed features of the invention, the heat-soaking is accomplished by subjecting the insert to energy that is preferentially absorbed and distributed throughout the insert. Preferably, the insert is heated while placed against one surface of the mold surface prior to the introduction of the molten plastic, and the heat is supplied by infrared energy, e.g., broadband infrared energy. Alternatively, the heat-soaking can be accomplished by irradiating the insert with microwave energy, ultraviolet energy, or radio frequency energy.

Further, the insert can comprise a single layer or multiple layers, with one of such layers having one or more selected optical or physical attributes. Examples of optical attributes include polarization, color, photochromism, electrochromism, selective visible transmittance, selective ultraviolet transmittance, selective infrared transmittance, higher refractive index than at least one other layer, and lower refractive index than at least one other layer. Examples of physical attributes include abrasion resistance, impact resistance, chemical resistance, and mechanical support.

The method can be used to achieve good replication in the final part, even when the insert curvature differs from the average curvature expected for the resultant molded part by more than 10%.

The invention also resides in composite optical parts prepared using the specified method.

Other features and advantages of the present invention should become apparent from the following description of the preferred method, taken in conjunction with the accompanying drawings, which illustrate, by way of example, the principles of the invention.

DETAILED DESCRIPTION OF THE PREFERRED METHOD

Figure 1:
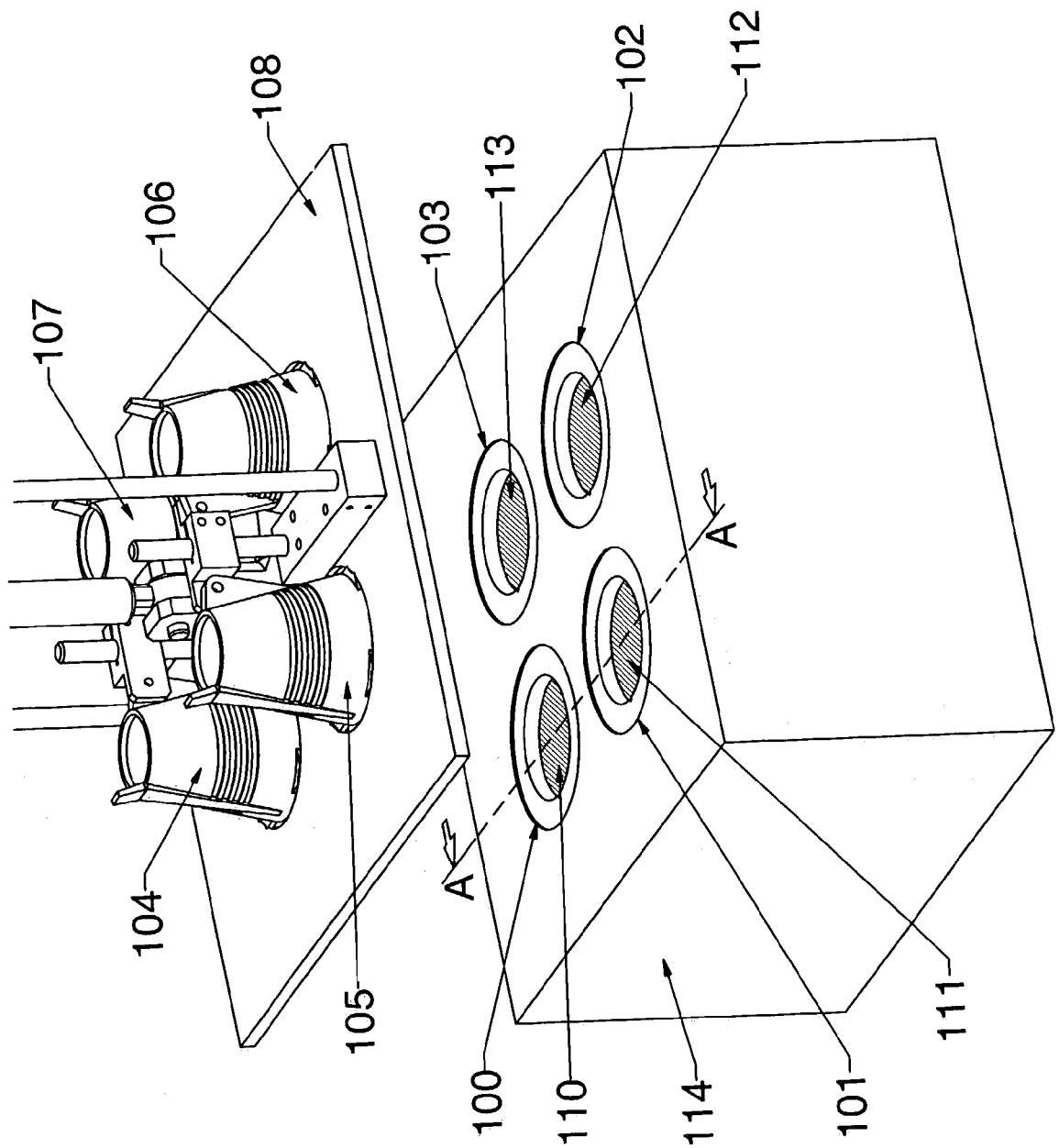
FIG. 1 is a perspective view of a system equipped with infrared heaters to pre-condition inserts resting in a multiple mold cavity base.

In accordance with the present invention, there is provided a method to pre-condition inserts prior to injection molding. An insert is defined as a discrete part incorporating a single layer or, alternatively, multiple layers, adhered to each other to provide support and various physical or chemical properties to the insert. One or more of the layers will possess particular desired attributes for the insert, and subsequent molded plastic part. For example, the insert may provide optical attributes, such as selective ultraviolet-, visible- or infrared-light transmittance, reflectance or absorbance, polarization properties, color, decoration, photochromism, electrochromism, and the like. One or more layers of the insert also might have a higher or lower refractive index than that of the other layer(s), or than that of the bulk of the resultant molded part, thereby providing desired optical power effects. Similarly, an insert, or an outer layer of a multi-layer insert, might possess desired physical attributes, such as abrasion resistance, impact resistance, chemical resistance, protection of the optical attributes, mechanical support for an inner layer, and the like. In a multi-layer insert, the layers can be adhered to each other by optical-quality adhesives, mechanical bonding, chemical bonding, or a combination of these means.

In a preferred and exemplary embodiment, the insert comprises three polymeric layers adhered to each other, with the two outer layers protecting the optical attributes of the inner layer and providing mechanical support to the insert structure. The inner layer in this exemplary embodiment is a polarizer film, such as a polyvinyl alcohol-based polarizer, which may contain iodine, or other inorganic and organic dichroic dyes. Other polarizer films include, for example, polyvinylene (such as the K and KE polarizers from Polaroid Corp.), and multi-layer films such as those described in U.S. Pat. Nos. 5,882,774 and 6,113,811, and references cited in those patents. The outer layers protect the polarizer from thermal degradation and from physical damage, and they are bonded to the inner layer using an optical-quality adhesive. A description of one preferred embodiment of this insert design is provided in U.S. Pat. No. 5,051,309, which is incorporated herein by reference. In this instance, the outer layers are configured both to enhance the optical performance of the insert and to protect the inner polarized layer.

The inserts are placed within a cavity of an injection mold assembly, and molten thermoplastic material then is injected into the cavity, to contact at least one side of the insert and join the insert to the final molded part. Prior to placing the insert within the cavity, the insert may be shaped to a contour complementary to that of the cavity's molding surface. This aids in replication of the mold surface. In addition, the insert may be dried to prevent any moisture from the plastic interfering with bonding during injection molding, or giving rise to bubbles or inclusions in the molded part.

Surprisingly, it has been found that if the insert is heat soaked immediately before molding, better bonding and mold replication will result. This was surprising for several reasons. First, the insert would subsequently experience much higher temperature during the molding process, and it was surprising that mild heat immediately before molding would have a demonstrable effect on the bonding and replication of the final part. Second, the layers of the insert are often heat-sensitive, and if over-heated, can burn, shrink, warp, or show other forms of physical or chemical damage that degrades their designed properties. Therefore, a heat soak would be expect to damage the part rather than improve its performance in the subsequent composite part. Third, the plastic layers of an insert typically have very poor heat conductivity. For instance, even if the insert is heated to dry it, the insert almost immediately cools to room temperature when the heat is removed. It was surprising that sufficient heat could be retained in the part to create a substantial improvement in performance. Thus, the manner in which this pre-conditioning heat is delivered also is an important feature of the invention.

A preferred embodiment of an injection molding system that can be used to carry out the method of the invention is illustrated in FIG. 1. A common configuration in injection molding is an assembly of two molding surfaces or cavities, which can then be separated to remove the molded parts. FIG. 1 shows, by way of a non-limiting example, a set of four mold cavities 100-103 that will each be capped by a mating mold cavity (not shown) during the injection molding process. The cavities may be the same, similar, or entirely different shapes, and are not limited by the present invention. Similarly, while the molds are shown in a horizontal position (i.e., bottom mold cavities), they could alternatively be configured to be vertical or tilted.

Four heat sources 104-107 are mounted in a removable frame 108 over the four exemplary bottom mold cavities 100-103. Inserts 110-113 rest on the surfaces of the respective mold cavities 100-103. Each insert may cover all or only a portion of its respective cavity. Alternatively, each insert may overlap in part or in whole to a portion of the mold support surface 114 surrounding the cavity.

Most effective pre-conditioning occurs when heat energy from the heat sources 104-107 is preferentially absorbed and rapidly distributed throughout the inserts. Preferably, the heat sources are infrared lamps. The particular infrared frequency is not critical, but broadband energy is preferred for greater flexibility in coupling energy efficiently into many different insert plastic materials. Preferably, the lamps have a wattage in the range of about 300 to about 600 Watts, predominately in the near- and mid-infrared range. Alternately, one could use lamps emitting specific infrared frequencies that are preferentially absorbed by the particular insert of choice for faster heat transfer.

The infrared energy is especially useful for heating the plastics of the inserts due to the numerous infrared absorption bands inherent in polymeric materials. Alternately, it is possible that ultraviolet light, microwave, radio frequency or other energy sources could be matched to absorption bands of the insert, for efficient pre-conditioning according to the present invention.

There are several important factors in the selection and implementation of the heat source. First, the heat source preferably has a frequency that efficiently couples energy into the insert. Second, the heat source's energy preferably is converted quickly into diffused warming of the insert, rather than localized heating. Specifically, it should not merely affect the outermost surface of the insert. This ensures that the insert is pre-conditioned as a whole and warmed in a fairly uniform manner, rather than creating hot spots and potential damage or uneven heat-induced changes. Third, the heat source preferably is of sufficient intensity to warm the insert relatively quickly, to avoid undue lengthening of the manufacturing process. In addition, if the intensity is too low, ambient cooling may compete with the pre-conditioning process. Similarly, if the intensity is too high, the insert can be damaged by rapid absorption, resulting in burns, deformations, and other undesired physical or chemical changes. The intensity should be sufficient to warm the insert, but not to soften it to the point that it loses its structural integrity.

The heat source may be selected for optimal compatibility with the mold cavity construction as well as the insert. For example, if microwave energy is used, it may be preferred to have non-conductive molds rather than metal molds. Alternately, the mold may be configured to reflect the energy from the heat source, for a double pass of preconditioning energy. Similarly, if the insert or the mold are configured to have enclosed or undercut detail, it may be more effective to use heat sources that are not dependent on line-of-sight irradiation, or that can be repositioned during the pre-conditioning process for more even heat distribution.

As shown in FIG. 1, the heat sources are mounted on the frame 108, such that the pre-conditioning structure can be moved into position relative to the mold cavities 100-103 for treatment, and then removed for completion of the injection molding process. Preferably, the pre-conditioning heat is applied within the last few seconds before the mold assembly is closed and the molten plastic is injected. This ensures that the conditioning heat is not dissipated by the ambient environment.

To aid in the heating process, the mold cavities 100-103 optionally may be maintained at an elevated temperature during pre-conditioning.

Surprisingly, it was found that this pre-conditioning is very effective even with relatively thick multi-layer inserts that were only approximately curved to the contours of the molding surface. This was true even when the inserts had curvatures that differed significantly from the mold or expected resultant part. For example, polarizing multi-layer inserts used in ophthalmic lenses are typically about 0.5-1.0 mm thick, and they often are pre-shaped to spherical surfaces that approximate the curvature of a single-vision eyeglass lens.

However, if one chooses to use such inserts to mold progressive power lenses, for example, the spherically shaped inserts must conform with optical perfection to mold contours that differ considerably from a uniformly spherical curve. Surprisingly, it was found that inserts having spherical curvatures more than about 10% different from the average curvature of the final molded part would successfully replicate the final mold contours when treated according to the present invention. For example, in the case of complex progressive lens mold surfaces, it was found that spherically shaped inserts having curvatures up to at least 30% less than the average mold contour, and up to at least 50% more than the average contour, could be successfully pre-conditioned according to the present invention, for markedly improved replication of the entire mold surface.

In addition to taking on a new and more complex curvature, the insert must also bond thoroughly and securely with the molten polymer to be injected against it, and must maintain that new curvature and adhesion while and after the molten polymer hardens to its final form. The fact that this could be accomplished successfully by the present method was indeed surprising.

Figure 2:
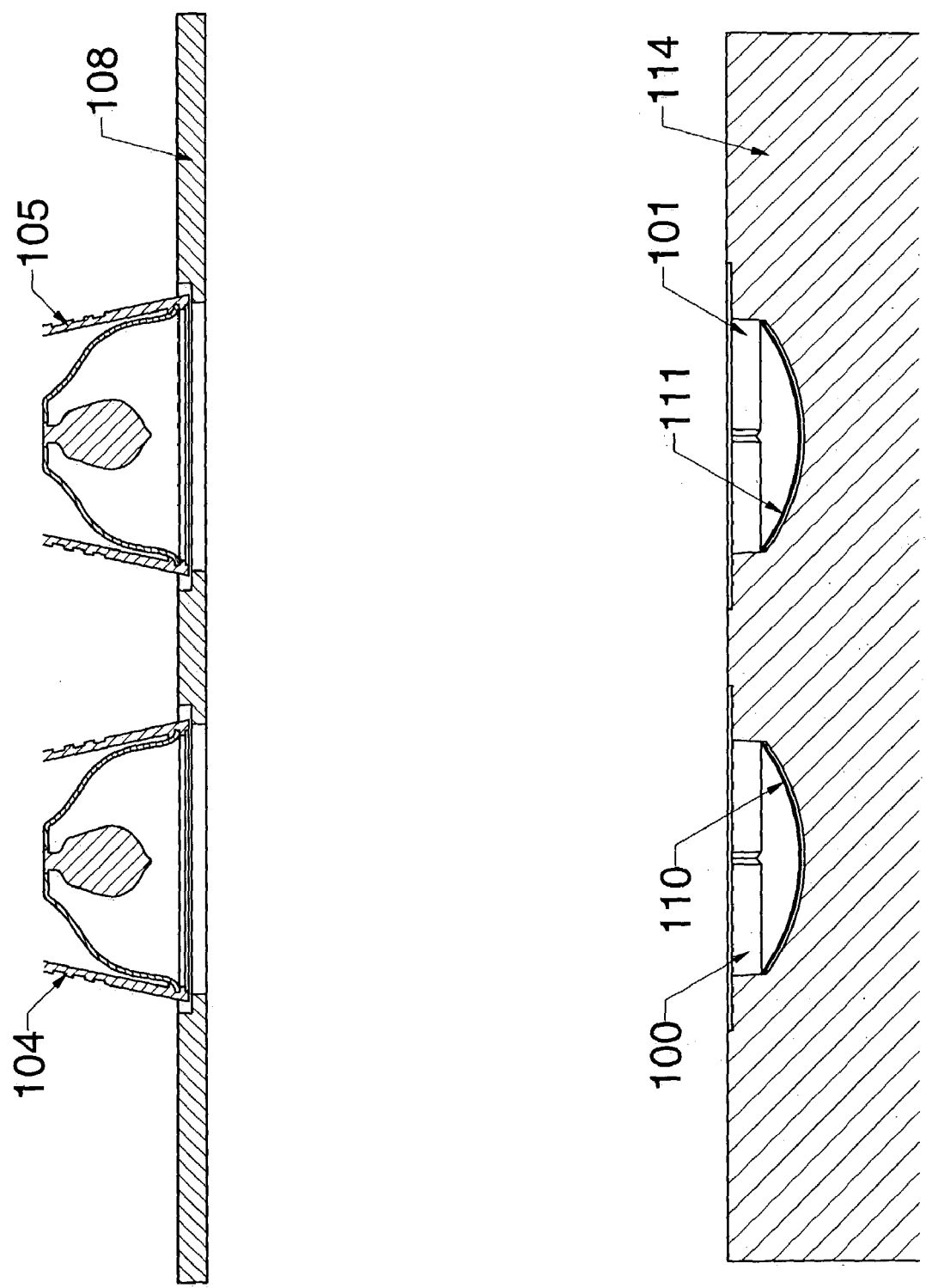
FIG. 2 is a side section view of the system of FIG. 1, taken in the direction of the arrows A-A in FIG. 1.

FIG. 2 is a cross-sectional view of the pre-conditioning system of FIG. 1. Inserts 110 and 111 rest within the respective mold cavities 100 and 101, and infrared lamps in their housings 104 and 105 are positioned above them. The frame 108 may be raised or lowered relative to the mold support surface 114, both to change the flux of energy presented to the inserts and to provide flexibility in accommodating manufacturing processes. Thus, the entire frame can be placed in a fixed location, and the mold cavities and any mold support surface traverse through the pre-conditioning station before injection molding. Alternatively, the frame can be removably positioned relative to the molding apparatus, to move into alignment with the mold cavities and inserts for pre-conditioning, and then to move out of the way as the mating second mold surface (not shown) is positioned adjacent to the first mold surface, to complete the enclosure of the mold assembly. Additionally, the frame can be controlled either manually or automatically, both for presenting the pre-conditioning heat and for articulated movement relative to the mold cavities.

In this preferred embodiment, the mold cavities 100-103 are shown within an extended support surface 114 containing multiple cavities. The present invention is not limited to only this configuration, but can be used for pre-conditioning with single molds or other mold arrangements.

Similarly, depending on the mold cavity material and the energy source for preconditioning, it may be possible to heat through the base or bulk of the molding support surface, thus presenting energy first to the insert surface that rests against the mold surface. This has advantages in some applications, for better absorption of energy with improved conformance to the molding surface. In such instances, it is preferred that the mold material evenly conduct the heat to the insert. In fact, in this configuration, the mold surface may be incorporated as an active element of the pre-conditioning process, to regulate the amount of energy or aid in distributing it to the insert.

The invention will now be described in more specific detail with reference to the following non-limiting examples.

A stainless steel mold cavity surface as shown in FIG. 1 was equipped with mold cavities having complex curvatures to form progressive power semi-finished eyeglass lens blanks. Progressive lenses have a complex curvature that progresses from an average baseline curvature in one portion of the lens, to a much steeper curvature in the add power portion of the lens. To accomplish this significant and controlled change in specific regions of the lens or lens blank, the surrounding areas of the lens are also markedly varied from a true spherical curve. Such lenses are commonly designated in the ophthalmic industry as "nominal base power—add power," such as 4-225 and 8-300. For clarity in the Examples below, the true, measured base curve is also indicated, which is a closer approximation to the average curvature of the lens surface. The expected add power on the mold surface and resultant lens blank is indicated by the second number in the designation, in units of Diopters *100. Values of 200 to 300 adds represent significantly sharper curvatures than the base curve, and 300 adds are often the highest excursions attempted.

For each Example, the tests were run using two sets of progressive mold cavities, in groups of four mold cavities within the mold support surface. Higher add powers (in the range of 225 to 300) were used as more demanding tests of the possible limits of the invention In these Examples, four inserts of a given spherical curvature were placed in the mold cavities that define the front surface of the resultant lens blanks. The inserts in these Examples were commercially available polarizer wafer inserts, constructed as outer polycarbonate layer/adhesive/polarizing film layer/adhesive/outer polycarbonate layer. The inserts were approximately 0.6 mm thick.

Commercially available 600 Watt near- to mid-range infrared heat lamps were mounted above the mold cavity surface 114 at various heights by moving the frame 108, and allowed to irradiate the inserts within the mold cavities 100-103 for specified amounts of time. The heat source frame was then immediately moved away from the mold cavities and their support surface, and the other, capping portion of the mold cavities joined to mold support surface 114, to complete the mold assembly. Standard injection molding techniques using optical-grade polycarbonate were used to form the progressive lenses immediately thereafter. The molded lenses were evaluated for cosmetic defects, such as delamination of the insert from the body of the lens blank, discoloration due to thermal damage on the insert, and deformation of the insert. Optical distortion due to incomplete matching of the insert with the lens design was evaluated visually. Additionally, optical distortion and add power were measured with a Humphrey Lens Analyzer (Humphrey Systems, Dublin Calif.). These additional measurements indicate whether sufficient reforming of the insert has occurred to match the much steeper curvature of the add area of the lens blank and achieve the designed add power.

COMPARATIVE EXAMPLES 1-2

In Examples 1-2, the polarizing inserts to be incorporated with this complex design had simple spherical shaping to either 6.0 Diopters of curvature (flatter than the designed base curvature), or 6.35 Diopters of curvature (steeper curvature than the expected resultant base curvature of the product). The two groups of four mold cavities for these examples were as follows. Group 1 contained two 6-250 R molds, and two 6-250 L molds, and Group 2 contained one 6-275 R mold, one 6-275 L mold, one 6-300 R mold, and one 6-300 L mold. The true measured average curve of the mold cavity, that was expected to be replicated to the resultant molded lenses, was actually 6.29D.

The inserts were placed in the mold cavities and injection molded with polycarbonate without any infrared or other pre-conditioning. Cosmetically, the resultant lenses showed optical distortion and fine cracks in the add regions. Some lens blanks exhibited partial delamination of the insert near the add region. Optically, the lens blanks showed excessive cylinder (optical distortion) and lower than acceptable add powers due to non-conformance of the insert to the complex mold curvature.

Thus, even with a 6.35 D spherical curvature to the insert, which was close to the measured average mold curvature value, good optical properties could not be obtained in the molded part when no pre-conditioning was used.

COMPARATIVE EXAMPLE 3

The same two insert curves and the same groups of mold cavities were used as in Comparative Examples 1-2. However, in this Example 3, the inserts were pre-heated in a standard convection oven for 2 hours at 130° C. immediately prior to molding. The inserts were transferred from the oven immediately to the mold cavities. It was noted that the inserts could be handled during transfer with lightweight cotton gloves, and were not uncomfortably warm to the touch.

The resultant molded lens blanks showed optical distortion, fine cracks, and spot delamination in the add areas. Optically, the lens blanks showed excessive cylinder and weak add powers.

This Example illustrates the importance of efficiently coupling energy into the insert. Due to the low heat conductivity of the inserts used in these Examples, simple convection thermal heating does not couple effectively into the insert for good pre-conditioning.

EXAMPLES 4-12

The same two insert curves and the same groups of mold cavities were used as in Comparative Examples 1-3. However, in the following Examples, infrared energy was applied to pre-condition the inserts. The infrared energy was varied in these Examples by moving the lamps in their frame to varied, controlled distances from the mold cavities. The effect of infrared exposure time was evaluated also.

The experimental variables and test results are summarized in Table I.

TABLE I

Experimental conditions and molded lens results for Examples 4-12.

| Ex. # | Insert Curve (D) | Distance (IR lamp base to top of mold support surface, cm) | IR exposure time, s | Results: Lens cosmetics | Results: lens optics |
|---|---|---|---|---|---|
| 4 | 6.0 | 10.8 | 15 | Fine cracks on outermost surface of insert near add area | Distortion and weak power in add section |
| 5 | 6.0 | 10.8 | 20 | As above | As above |
| 6 | 6.0 | 10.8 | 25 | As above | As above |
| 7 | 6.0 | 6.99 | 15 | Inserts warped | As above |
| 8 | 6.0 | 6.99 | 20 | Inserts burned (heat discoloration), delamination and cracks | As above |
| 9 | 6.35 | 9.525 | 15 | inconsistent | 1 of 8 lenses had distortion and weal power in add section |
| 10 | 6.35 | 9.525 | 20 | Good | Good |
| 11 | 6.35 | 9.525 | 25 | Inserts burned and warped | Distortion and weak power in add section |
| 12 | 6.35 | 9.525 | 18 | Good | Good |

In Examples 9-12, an infrared temperature gauge showed the insert temperature to be in the range of about 98-104° C., after 9 seconds of exposure. This is substantially less than the subsequent molding temperatures, which typically exceed 180° C. These Examples illustrate that pre-conditioning can be successfully designed to improve the optical and cosmetic properties of parts molded with an insert having simpler, different curvature from the final part. Starting with a insert curvature that more closely approximates, or slightly exceeds, at least a portion of the final part's curvature aids in the implementation of the present invention.

EXAMPLES 13-19

The polarizer inserts used in these Examples had spherical shapes with either significantly lower curvature than the average of the mold surface, or significantly steeper curvature, namely 3.83D and 6.0D, respectively. Two groups of mold cavities were again used. The groups of four mold cavities for these examples were as follows. Group 1 contained one 4-225 mold, one 4-225 L mold, one 4-250 R mold, and one 4-250 L mold. Group 2 contained one 4-275 R mold, one 4-275 L mold, one 4-300 R mold, and one 4-300 L mold. The true average curve as measured on these mold cavities, and therefore expected to be replicated to the resultant molded lenses, was actually 4.32 D.

TABLE II

Experimental conditions and molded lens results for Examples 13-19.

| Ex. # | Insert Curve (D) | Distance (IR lamp base to top of mold support surface, cm) | IR exposure time, s | Results: Lens cosmetics | Results: lens optics |
|---|---|---|---|---|---|
| 13 | 3.83 | 10.8 | 15 | Burns/fine cracks around add area | good |
| 14 | 3.83 | 10.8 | 25 | As above | good |
| 15 | 3.83 | 13.97 | 15 | Delamination around add area | Distortion in add area |
| 16 | 3.83 | 13.97 | 25 | Warped as well as delamination | Distortion in add area |
| 17 | 3.83 | 9.525 | 12 | Fair, some minor burns around edge of add area | Good |
| 18 | 3.83 | 9.525 | 18 | Some minor burns around add area | Good |
| 19 | 6.0 tested on 4-300 mold only | 9.525 | 15 | Fair, some slight stress around add area | Good |

Examples 13-18 show that despite a very marked difference in curvature between the insert and even the nominal base curve of a high add mold, demonstrable improvements in cosmetic and optical properties were obtained by use of the present invention. In Example 19, the average of the molded part's surface curvature can be roughly approximated by the measured average curve value of 4.32D, while the local surface excursion for the add area of this 4-300 design will have a value near 7.3D. The results of Example 19 illustrates that, with the present invention, one can pre-condition an insert with a curvature markedly steeper than the average mold surface and improve the optical and cosmetic properties of the resultant molded part.

Accordingly, a method of pre-conditioning inserts for improved replication during injection molding is disclosed. The pre-conditioned inserts exhibit improved bonding with the injection-molded material and improved replication of complex molding surfaces.

While examples have been given that are drawn from ophthalmic lens molding manufacturing, the invention applies to other insert molding operations as well. Similarly, even within ophthalmic lens manufacturing, the present invention would find application for a wide range of molding operations, including pre-conditioning inserts having designed optical or mechanical properties for incorporation with progressive lenses, decentered designs with atoricity, multiple axis spherical curvatures, aspheric/atoric designs for wraparound frames, goggles, shields, and other complex designs.

While preferred methods are disclosed herein, many variations are possible which remain within the concept and scope of the invention. Such variations would become clear to one of ordinary skill in the art after inspection of the specification. The inventions therefore are not to be restricted except within the spirit and scope of the appended claims.

The invention claimed is:

1. A method of pre-conditioning an optical part insert for use in injection molding an optical part with improved replication of the injection-molding cavity, comprising:

providing a mold cavity configured for use in injection molding the optical part;

providing the optical part insert having a curvature measurably different from the average curvature of a molding surface of the mold cavity;

placing the optical part insert in a position resting against the molding surface of the mold cavity;

providing an irradiation source separate from the mold cavity; and heat-soaking the insert via radiant energy from the irradiation source while the insert rests against the molding surface of the mold cavity, wherein the radiant energy is preferentially absorbed by the insert, such that the insert is warmed but does not lose its structural integrity.

2. A method of pre-conditioning an insert as defined in claim 1, wherein heat-soaking comprises irradiating the insert with infrared energy.

3. A method of pre-conditioning an insert as defined in claim 2, wherein the infrared energy irradiating the insert comprises broadband infrared energy.

4. A method of pre-conditioning an insert as defined in claim 1, wherein heat-soaking comprises irradiating the insert with microwave energy, ultraviolet energy, or radio frequency energy.

5. A method of pre-conditioning an insert as defined in claim 1, wherein the insert comprises a polarizer.

6. A method of pre-conditioning an insert as defined in claim 1, wherein the insert comprises multiple layers.

7. A method of pre-conditioning an insert as defined in claim 6, wherein the insert comprises a layer having one or more selected optical properties.

8. A method of pre-conditioning an insert as defined in claim 6, wherein the insert comprises a layer having an optical attribute selected from the group consisting of polarization, color, photochromism, electrochromism, selective visible transmittance, selective ultraviolet transmittance, selective infrared transmittance, higher refractive index than at least one other layer, and lower refractive index than at least one other layer.

9. A method of pre-conditioning an insert as defined in claim 6, wherein the insert comprises a layer having one or more selected physical attributes.

10. A method of pre-conditioning an insert as defined in claim 6, wherein the insert comprises a layer having a physical attribute selected from the group consisting of abrasion resistance, impact resistance, chemical resistance, and mechanical support.

11. A method of pre-conditioning an insert as defined in claim 1, wherein the insert has a curvature that is steeper than the average curvature of the molding surface.

12. A method of pre-conditioning an insert as defined in claim 11, wherein the insert has a curvature at least 10% steeper than the average curvature of the molding surface.

13. A method of pre-conditioning an insert as defined in claim 1, wherein the insert has a curvature that is shallower than the average curvature of the molding surface.

14. A method of pre-conditioning an insert as defined in claim 13, wherein the insert has a curvature at least 10% shallower than the average curvature of the molding surface.

* * * * *